United States Patent
Lu et al.

(10) Patent No.: US 9,255,486 B2
(45) Date of Patent: Feb. 9, 2016

(54) ROTATING BRUSH SEAL

(75) Inventors: Guoqiang Lu, Watervliet, NY (US);
Mehmet Demiroglu, Troy, NY (US);
Binayak Roy, Mountain View, CA (US);
Deepak Trivedi, Schenectady, NY (US);
Xiaoqing Zheng, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 796 days.

(21) Appl. No.: 13/554,048

(22) Filed: Jul. 20, 2012

(65) Prior Publication Data

US 2012/0288361 A1 Nov. 15, 2012

Related U.S. Application Data

(63) Continuation-in-part of application No. 13/073,145, filed on Mar. 28, 2011, now Pat. No. 9,121,297.

(51) Int. Cl.
*F01D 11/00* (2006.01)
*F04D 29/08* (2006.01)
*F16J 15/32* (2006.01)

(52) U.S. Cl.
CPC ............ *F01D 11/001* (2013.01); *F16J 15/3288* (2013.01); *F05D 2240/56* (2013.01)

(58) Field of Classification Search
CPC ..... F05D 2240/56; F04D 29/08; F04D 29/10; F01D 11/00; F01D 11/001; F01D 11/02; F01D 11/12; F16J 15/3288; F05B 2240/571
USPC .............................. 415/173.1, 174.2; 277/355
See application file for complete search history.

(56) References Cited

U.S. PATENT DOCUMENTS

| 885,032 A | 4/1908 | Ferranti |
| 2,878,048 A | 3/1959 | Peterson |

(Continued)

FOREIGN PATENT DOCUMENTS

| EP | 1066480 A2 | 1/2001 |
| EP | 1130294 A2 | 9/2001 |

(Continued)

OTHER PUBLICATIONS

Lattime, S.B., et al., Rotating Brush Seal, International Journal of Rotating Machinery, 8(2): 153-160 (2002).

(Continued)

*Primary Examiner* — Dwayne J White
*Assistant Examiner* — Joshua R Beebe
(74) *Attorney, Agent, or Firm* — Fletcher Yoder, P.C.

(57) ABSTRACT

A brush seal for use between a rotating component and a stationary component in a turbomachine is disclosed. The brush seal according to embodiments of this invention includes a set of bristles having a fixed end and a free end, wherein the fixed end is attached to the rotating component with a mechanical clamping element and the free end extends towards the stationary component, and wherein the set of bristles are angled axially at an axial angle with respect to the rotating component. In one embodiment, the fixed end of the set of bristles are wrapped at least partially around a core element and the clamping element partially surrounds the core element and the fixed end of the set of bristles, wherein the clamping element secures the fixed end of the set of bristles within a circumferential groove in the rotating component.

15 Claims, 11 Drawing Sheets

(56) References Cited

U.S. PATENT DOCUMENTS

| | | | |
|---|---|---|---|
| 3,917,150 | A | 11/1975 | Ferguson et al. |
| 4,595,207 | A | 6/1986 | Popp |
| 5,029,875 | A | 7/1991 | Spain et al. |
| 5,090,710 | A | 2/1992 | Flower |
| 5,316,318 | A | 5/1994 | Veau |
| 5,425,543 | A * | 6/1995 | Buckshaw et al. ............ 277/350 |
| 5,496,045 | A | 3/1996 | Millener et al. |
| 5,752,802 | A | 5/1998 | Jones |
| 5,799,952 | A | 9/1998 | Morrison et al. |
| 5,944,320 | A | 8/1999 | Werner et al. |
| 5,961,280 | A | 10/1999 | Turnquist et al. |
| 5,997,004 | A | 12/1999 | Braun et al. |
| 6,010,132 | A | 1/2000 | Bagepalli et al. |
| 6,012,723 | A * | 1/2000 | Beeck ............ 277/355 |
| 6,131,910 | A | 10/2000 | Bagepalli et al. |
| 6,161,836 | A | 12/2000 | Zhou |
| 6,173,962 | B1 | 1/2001 | Morrison et al. |
| 6,226,975 | B1 | 5/2001 | Ingistov |
| 6,293,553 | B1 | 9/2001 | Werner et al. |
| 6,308,959 | B1 | 10/2001 | Sokolihs et al. |
| 6,318,728 | B1 | 11/2001 | Addis et al. |
| 6,352,263 | B1 | 3/2002 | Gail et al. |
| 6,488,471 | B1 | 12/2002 | Stibich et al. |
| 6,502,823 | B1 | 1/2003 | Turnquist et al. |
| 6,505,834 | B1 | 1/2003 | Dinc et al. |
| 6,547,522 | B2 | 4/2003 | Turnquist et al. |
| 6,550,777 | B2 | 4/2003 | Turnquist et al. |
| 6,622,490 | B2 | 9/2003 | Ingistov |
| 6,695,314 | B1 | 2/2004 | Gail et al. |
| 6,786,488 | B2 | 9/2004 | Laurello et al. |
| 6,840,518 | B2 | 1/2005 | Boston |
| 6,880,829 | B1 | 4/2005 | Datta |
| 7,032,903 | B1 | 4/2006 | Dalton et al. |
| 7,165,771 | B2 | 1/2007 | Beichl et al. |
| 7,168,708 | B2 * | 1/2007 | Dalton et al. ............ 277/355 |
| 7,182,345 | B2 | 2/2007 | Justak |
| 7,201,378 | B2 | 4/2007 | Kono |
| 7,255,352 | B2 | 8/2007 | Adis et al. |
| 7,384,235 | B2 | 6/2008 | Adis |
| 7,410,173 | B2 | 8/2008 | Justak |
| 7,445,212 | B2 * | 11/2008 | Gail et al. ............ 277/355 |
| 7,445,424 | B1 | 11/2008 | Ebert et al. |
| 7,461,847 | B2 | 12/2008 | Short et al. |
| 7,549,835 | B2 | 6/2009 | Brillert |
| 7,565,729 | B2 | 7/2009 | Adis et al. |
| 7,628,581 | B2 | 12/2009 | De Simone et al. |
| 7,653,993 | B2 | 2/2010 | Couture et al. |
| 7,717,671 | B2 | 5/2010 | Addis |
| 7,909,334 | B2 | 3/2011 | Beichl et al. |
| 8,075,254 | B2 | 12/2011 | Morgan et al. |
| 8,317,464 | B2 | 11/2012 | Alamsetty et al. |
| 2002/0050684 | A1 | 5/2002 | Kono |
| 2003/0151207 | A1 | 8/2003 | Shore |
| 2004/0100033 | A1 * | 5/2004 | Tong et al. ............ 277/411 |
| 2005/0073106 | A1 | 4/2005 | Thermos et al. |
| 2005/0110218 | A1 | 5/2005 | Morrison et al. |
| 2005/0111967 | A1 * | 5/2005 | Couture et al. ............ 415/173.4 |
| 2005/0179207 | A1 | 8/2005 | Datta |
| 2005/0194747 | A1 | 9/2005 | Morgan et al. |
| 2005/0285345 | A1 | 12/2005 | Webster |
| 2006/0021218 | A1 | 2/2006 | McMillan |
| 2006/0214378 | A1 | 9/2006 | Zheng |
| 2006/0249911 | A1 * | 11/2006 | Kowalczyk et al. ............ 277/355 |
| 2007/0018409 | A1 | 1/2007 | Justak |
| 2007/0069478 | A1 * | 3/2007 | Riggi et al. ............ 277/500 |
| 2007/0079493 | A1 | 4/2007 | Couture et al. |
| 2007/0096397 | A1 | 5/2007 | Justak |
| 2007/0120327 | A1 | 5/2007 | Justak |
| 2007/0214628 | A1 | 9/2007 | Adis et al. |
| 2007/0245532 | A1 * | 10/2007 | Bracken et al. ............ 29/23.51 |
| 2008/0095616 | A1 | 4/2008 | Alvanos et al. |
| 2008/0258403 | A1 * | 10/2008 | Beichl et al. ............ 277/355 |
| 2008/0284107 | A1 * | 11/2008 | Flaherty et al. ............ 277/355 |
| 2008/0309019 | A1 | 12/2008 | Wolfe et al. |
| 2009/0050410 | A1 | 2/2009 | Berberich |
| 2009/0072486 | A1 * | 3/2009 | Datta ............ 277/355 |
| 2009/0196742 | A1 * | 8/2009 | Turnquist et al. ............ 415/174.2 |
| 2009/0322028 | A1 | 12/2009 | Wright et al. |
| 2010/0034644 | A1 | 2/2010 | Scricca |
| 2010/0054924 | A1 | 3/2010 | Uyama et al. |
| 2010/0064499 | A1 | 3/2010 | Couture et al. |
| 2010/0068042 | A1 | 3/2010 | Bruck et al. |
| 2010/0320696 | A1 | 12/2010 | Gail et al. |
| 2013/0277918 | A1 * | 10/2013 | Fitzgerald et al. ............ 277/355 |

FOREIGN PATENT DOCUMENTS

| | | |
|---|---|---|
| EP | 1169585 A1 | 1/2002 |
| EP | 1235010 A2 | 8/2002 |
| EP | 1269048 A1 | 1/2003 |
| EP | 1312840 A2 | 5/2003 |
| EP | 1331423 A2 | 7/2003 |
| EP | 1353097 A2 | 10/2003 |
| EP | 1388695 A2 | 2/2004 |
| EP | 1391642 A2 | 2/2004 |
| EP | 1508671 A1 | 2/2005 |
| EP | 1510655 A1 | 3/2005 |
| EP | 1715223 A2 | 10/2006 |
| EP | 1783406 A2 | 5/2007 |
| EP | 1918523 A2 | 5/2008 |
| EP | 1947297 A2 | 7/2008 |
| EP | 2052171 A1 | 4/2009 |
| JP | 2005061587 | 8/2006 |
| JP | 2005337448 | 6/2007 |
| JP | 2007139045 | 12/2008 |
| JP | 2008064260 | 10/2009 |
| WO | 9942704 A1 | 8/1999 |
| WO | 0045070 A1 | 8/2000 |
| WO | 0155625 A1 | 8/2001 |
| WO | 0175339 A1 | 10/2001 |
| WO | 2005001316 A1 | 1/2005 |
| WO | 2005091994 A2 | 10/2005 |
| WO | 2007070071 A2 | 6/2007 |
| WO | 2008020002 A1 | 2/2008 |
| WO | 2008094761 A1 | 8/2008 |
| WO | 2009010040 A1 | 1/2009 |

OTHER PUBLICATIONS

Beebe, Office Action Communicataion for U.S. Appl. No. 13/073,145 dated Dec. 4, 2014, 26 pages.
Peters, Office Action Communication for U.S. Appl. No. 12/987,052 dated Jul. 18, 2013, 13 pages.
Peters, Office Action Communication for U.S. Appl. No. 12/987,052 dated Dec. 3, 2013, 10 pages.
Peters, Office Action Communication for U.S. Appl. No. 12/987,052 dated Jan. 30, 2014, 16 pages.
Peters, Office Action Communication for U.S. Appl. No. 12/987,052 dated Feb. 27, 2014, 11 pages.
Peters, Notice of Allowance and Fee(s) Due for U.S. Appl. No. 12/987,052 dated Apr. 8, 2014, 14 pages.
Holloway et al., "Rotating Intershaft Brush Seal for Sealing between Rotating Shafts, Part I—Experimental Performance Evaluation Compared to Mechanical Design Analysis", 43rd AIAA/ASME/SAE/ASEE Joint Propulsion Conference & Exhibit, Jul. 8-11, 2007, Cincinnati, OH, AIAA 2007-5732, 19 pages.
Mehta et al., "Rotating Intershaft brush Seal for Sealing between Rotating Shafts Part II—Experimental Data Evaluation and Modeling of the Brush Seal Leakage Flows", 43rd AIAA/ASME/SAE/ASEE Joint Propulsion Conference & Exhibit Jul. 8-11, 2007, Cincinnati, OH, AIAA 2007-5733, 16 pages.
Holloway et al., Innovative Rotating Intershaft Brush Seal for Sealing Between Rotating Shafts Part I—Mechanical Design of the Rotating Brush Seal, 42nd AIAA/ASME/SAE/ASEE Joint Propulsion Conference & Exhibit Jul. 9-12, 2006, Sacramento, California, AIAA 2006-4751, 21 pages.
Mehta et al., "Innovative Rotating Intershaft Brush Seal for Sealing Between Rotating Shafts Part II—Modeling of Brush Seal Leakage Flows", 42nd AIAA/ASME/SAE/ASEE Joint Propulsion Conference & Exhibit, Jul. 9-12, 2006, Sacramento, California, AIAA 2006-4752, 14 pages.
Beebe, Office Action Communication for U.S. Appl. No. 13/073,145 dated Jul. 1, 2014, 18 pages.
Beebe, Office Action Communication for U.S. Appl. No. 13/073,145 dated Mar. 11, 2014, 30 pages.

* cited by examiner

ROTATING BRUSH SEAL

The present application is a continuation-in-part of U.S. application Ser. No. 13/073,145, filed Mar. 28, 2011, currently pending, which is incorporated by reference herein.

FIELD OF THE INVENTION

Embodiments of the invention relate generally to brush seals and, more particularly, to a rotating brush seal attached to a rotating component via a core element and clamping element, wherein the bristles of the brush seal are angled axially, more than circumferentially.

BACKGROUND OF THE INVENTION

Known brush seals are typically mounted or attached to a stationary component of a turbomachine, where only the flexible bristle tips of the brush seal engage a rotating component during operation of the turbomachine to form a dynamic seal. Known brush seals also typically include bristles that are angled circumferentially with respect to the rotating component.

BRIEF DESCRIPTION OF THE INVENTION

In one embodiment, the invention provides a brush seal for use between a rotating component and a stationary component in a turbomachine, the brush seal comprising: a set of bristles having a fixed end and a free end, wherein the fixed end is attached to the rotating component, and wherein the set of bristles are angled axially at an axial angle with respect to the rotating component.

In another embodiment, the invention provides a turbomachine comprising: a rotating component; a stationary component; and a brush seal for use between the rotating component and the stationary component, the brush seal comprising: a set of bristles having a fixed end and a free end, wherein the fixed end is attached to the rotating component, and wherein the set of bristles are angled axially at an axial angle with respect to the rotating component.

In another embodiment, the invention provides a rotating brush seal for use between a rotating component and a stationary component in a turbomachine, the brush seal comprising: a set of bristles having a fixed end and a free end, wherein the fixed end is attached to the rotating component with a mechanical clamping element, and wherein the set of bristles are angled axially at an axial angle with respect to the rotating component.

In another embodiment, the invention provides a turbomachine comprising: a rotating component; a stationary component; and a brush seal for use between the rotating component and the stationary component, the brush seal having: a set of bristles having a fixed end and a free end, wherein the fixed end is wrapped around a core element and the free end extends towards the stationary component, and wherein the set of bristles are angled axially at an axial angle with respect to the rotating component; and a clamping element partially surrounding the core element and the fixed end of the set of bristles, wherein the clamping element secures the fixed end of the set of bristles within a circumferential groove in the rotating component.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
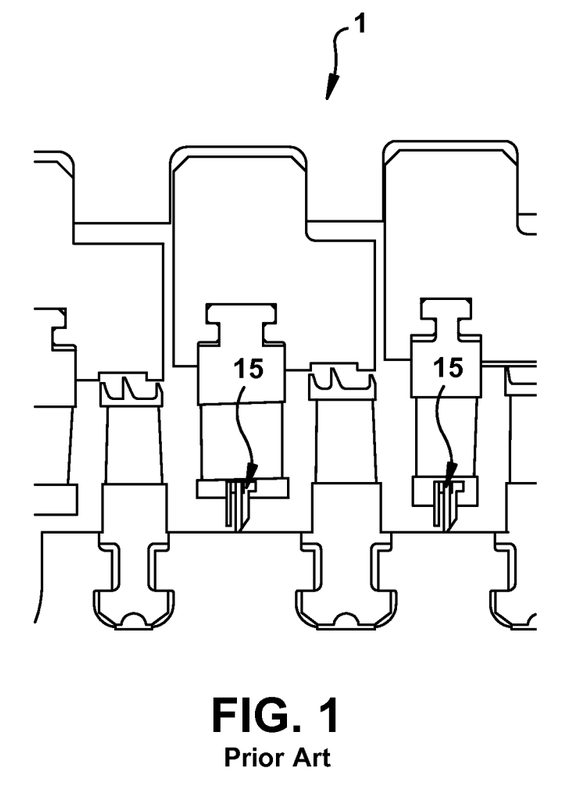
FIG. 1 shows a partial cross-sectional view of a turbomachine including a brush seal as known in the art.
Figure 2:
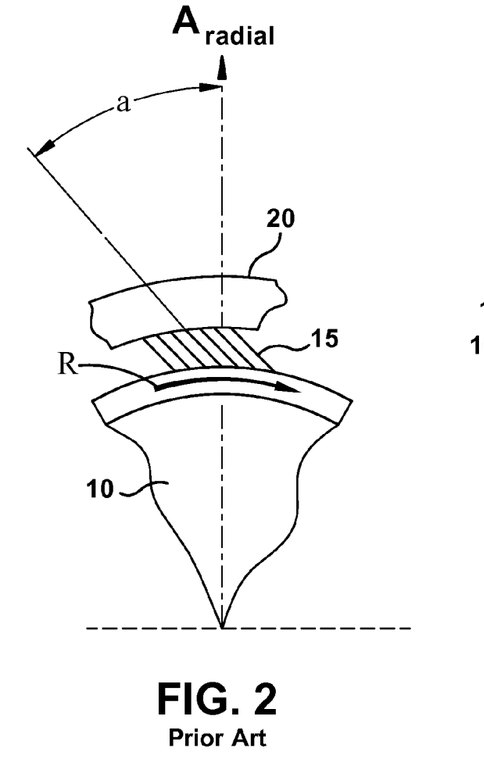
FIGS. 2 and 3 show cross-sectional views of a brush seal as known in the art.
Figure 3:
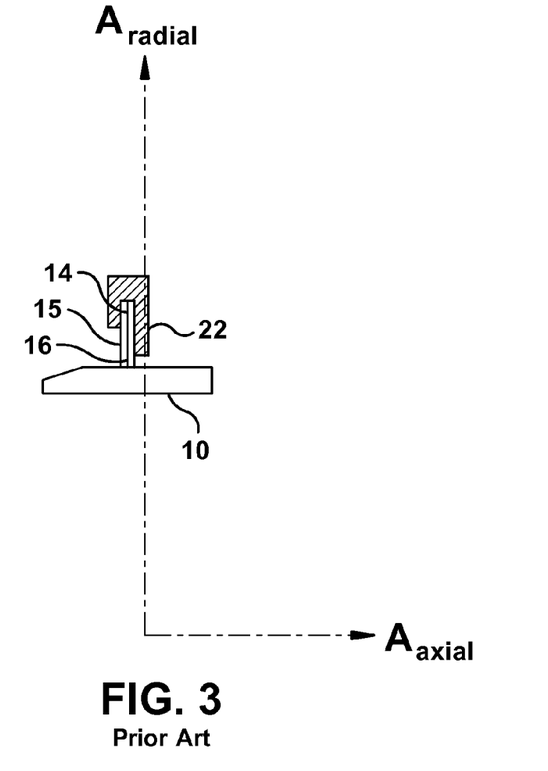

Turning now to the drawings, FIG. 1 shows a cross-sectional view of a conventional brush seal 15, as known in the art, in use in a turbomachine 1. Two additional views of brush seal 15 are shown in FIGS. 2 and 3. As illustrated in FIGS. 2 and 3, brush seal 15 comprises a set of bristles for use between a rotating component 10 (also referred to as a rotor) and a stationary component 20 of turbomachine 1 (FIG. 1), e.g., gas turbine, steam turbine, etc. It is understood that brush seal 15 forms a ring when installed in turbomachine 1, and typically brush seal 15 comprises a series of arcuate segments forming the complete ring when installed. As known in the art, brush seal 15 has a fixed end 14 mounted or attached to stationary component 20, and a flexible free end 16 that extends towards rotating component 10 to form a dynamic seal. A backing plate 22 can also be included (mounted on stationary component 10 (FIG. 2)), that acts to support flexible free end 16 as it is pressed against backing plate 22 by pressure loading while turbomachine 1 is in an operative state. As shown by arrow R in FIG. 2, in an operative state, rotating component 10 rotates in the direction of arrow, R. As shown in FIGS. 2 and 3, the bristles of brush seal 15 are angled circumferentially with respect to an axial axis, $A_{axial}$, and a radial axis, $A_{radial}$, of rotating component 10. The angled bristles are easy to deflect and will move radially as rotating component 10 undergoes excursion or vibration.

As illustrated by angle, a, in FIG. 2, the bristles of brush seal 15 are angled circumferentially with respect to the axial and radial axes ($A_{axial}$ and $A_{radial}$, shown in FIGS. 2 and 3) of rotating component 10. Since the bristles are angled along the same circumferential direction as rotational direction, R, of rotating component 10, the bristle tips can ride on the surface of rotating component 10 without causing buckling or locking up. The circumferential angle, a, of the bristles, also called the "cant angle" or "lay angle," is orientated such that free end 16 extends in the same direction as rotational direction, R, of rotating component 10.

Figure 4:
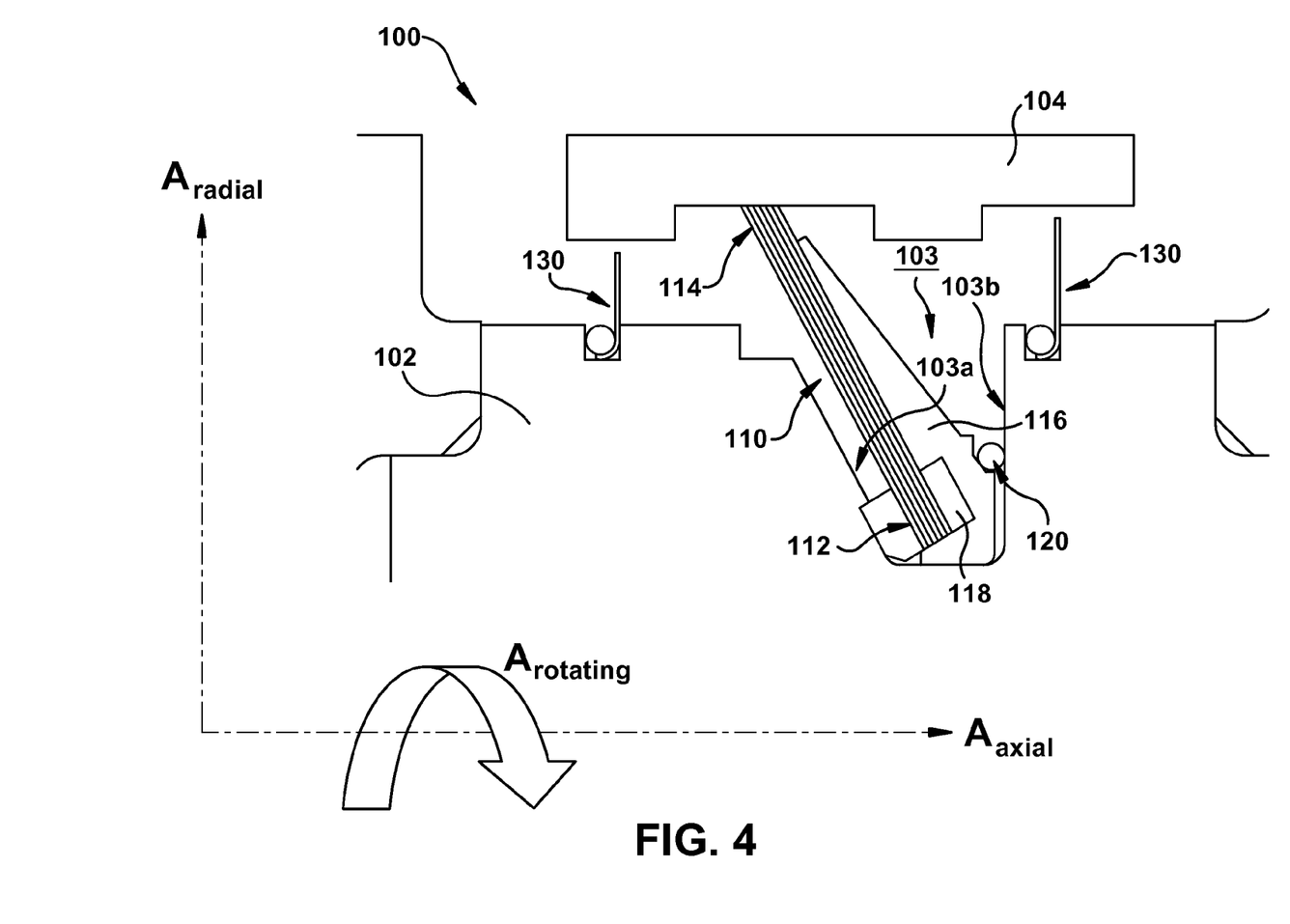
FIGS. 4-8 show cross-sectional views of brush seals according to embodiments of this invention.

Turning to FIG. 4, a cross-sectional view of a brush seal 100 according to embodiments of this invention is shown.

Figure 13:
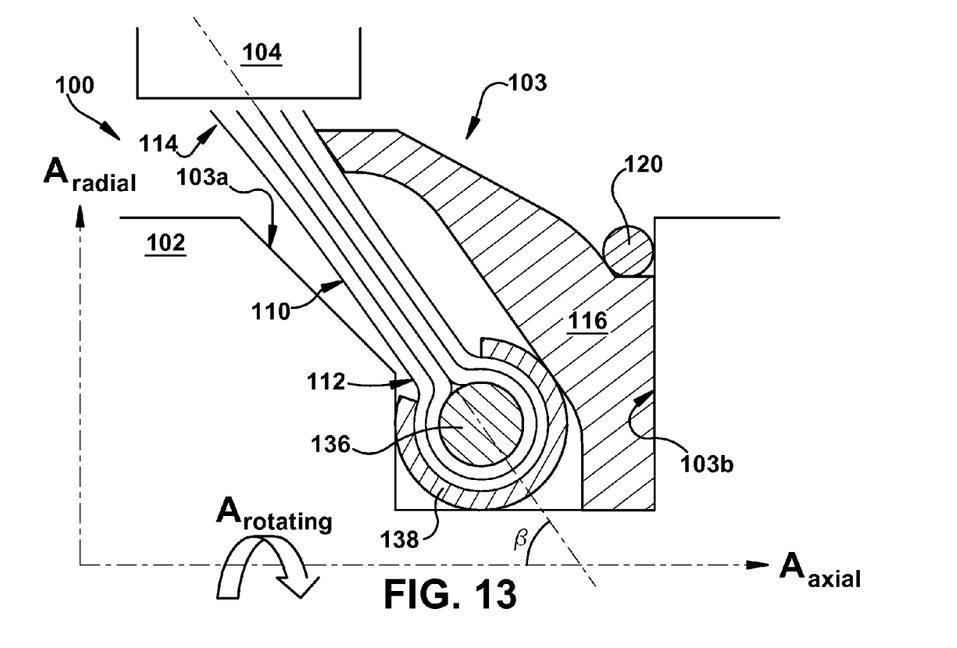
FIGS. 13-15 show cross-sectional views of brush seals according to embodiments of this invention.
Figure 14:
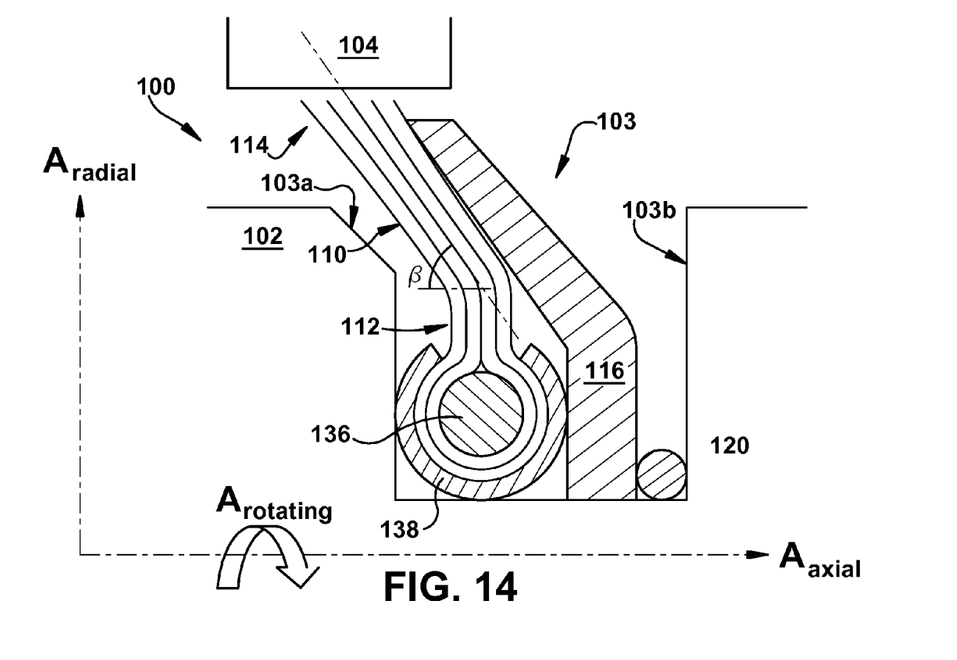
Figure 15:
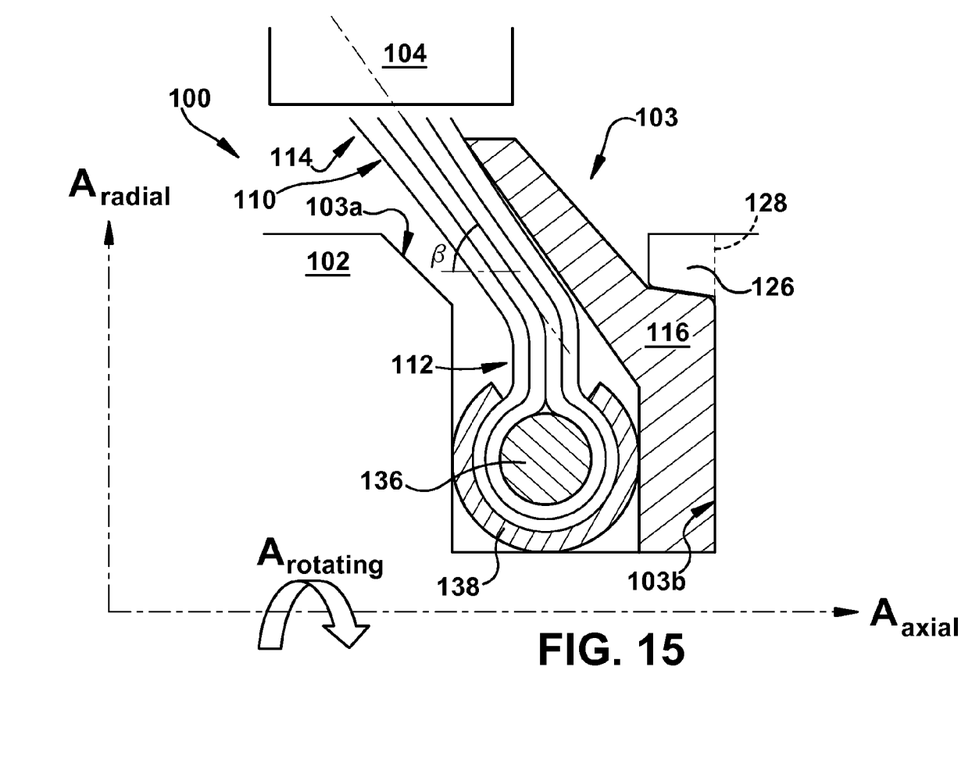

Brush seal 100 is used to form a dynamic seal between a rotating component 102 and a stationary component 104 in turbomachine 1 (FIG. 1). Brush seal 100 comprises a set of bristles 110 and forms a ring when installed. For example, brush seal 100 can comprises a series of arcuate segments forming a complete ring when installed. In addition, the set of bristles 110 has a fixed end 112 and a free end 114. However, brush seal 100 differs from known seals in the art in several aspects. For example, as discussed in more detail herein, fixed end 112 is mounted, or attached, to rotating component 102, not stationary component 104. Also, the set of bristles 110 is angled substantially axially, not mainly circumferentially (as in known systems), with respect to rotating axis, $A_{rotating}$, of rotating component 102 at an axial angle, β(FIGS. 13-15).

As shown in FIG. 4, brush seal 100 further includes a conical retaining plate 116 that at least partially supports, i.e., bears a partial load of, the set of bristles 110. Conical retaining plate 116 extends at least partially along a radial length of the set of bristles 110 such that, in an operative state of the turbomachine, conical retaining plate 116 at least partially supports the set of bristles 110 from centrifugal loading.

As referenced above, embodiments of this invention include a brush seal 100 having a fixed end 112 mounted, or attached to, rotating component 102. FIGS. 4-8 and FIGS. 13-15 show various examples of how fixed end 112 of set of bristles 110 can be mounted or attached to rotating component 102. As shown in FIGS. 4-8 and 13-15, a circumferential groove 103 can be included in rotating component 102. Circumferential groove 103 has a first, front, side 103a and a second, back, side 103b (FIGS. 4 and 13-15). Conical retaining plate 116 and fixed end 112 of the set of bristles 110 can be inserted into groove 103, and attached to rotating component 102 as desired. In a first example, shown in FIG. 4, retaining plate 116 can be attached to second, back, side 103b through the use of caulks and/or welds (e.g., caulk 120 and/or welds along faces of retaining plate 116 that contact groove 103), and fixed end 112 can be attached to first, front, side 103a and retaining plate 116 through the use of a side plate 118. It is also understood that brazed or soldered joints can be used in conjunction with, or in place of, the caulk and welded joints discussed herein.

Figure 5:
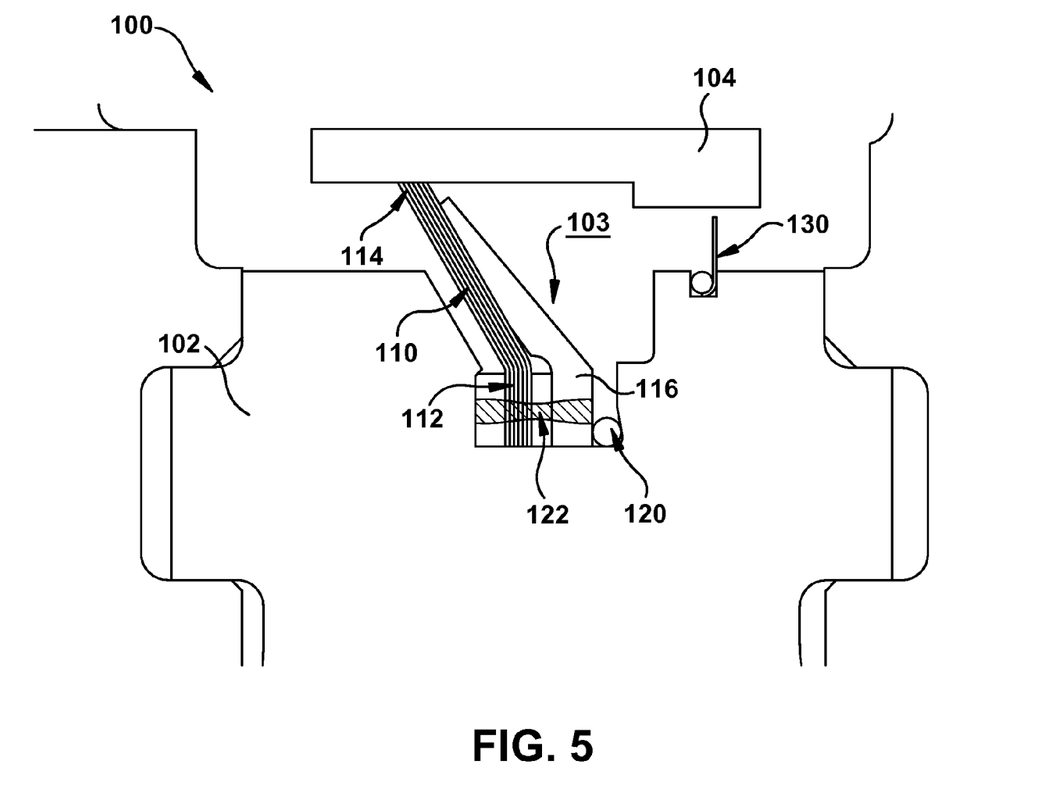

In a second example, shown in FIG. 5, the set of bristles 110 is bent such that fixed end 112 is axially displaced with respect to free end 114. Therefore, conical retaining plate 116 is similarly bent, such that conical retaining plate 116 extends along at least a portion of the length of the set of bristles 110. Again, as in FIG. 4, retaining plate 116 and the set of bristles 110 can be attached to groove 103 through the use of caulks and welds. An electron beam weld 122, shown in FIG. 5, is another example of how the set of bristles 110 may be attached to retaining plate 116.

Figure 6:
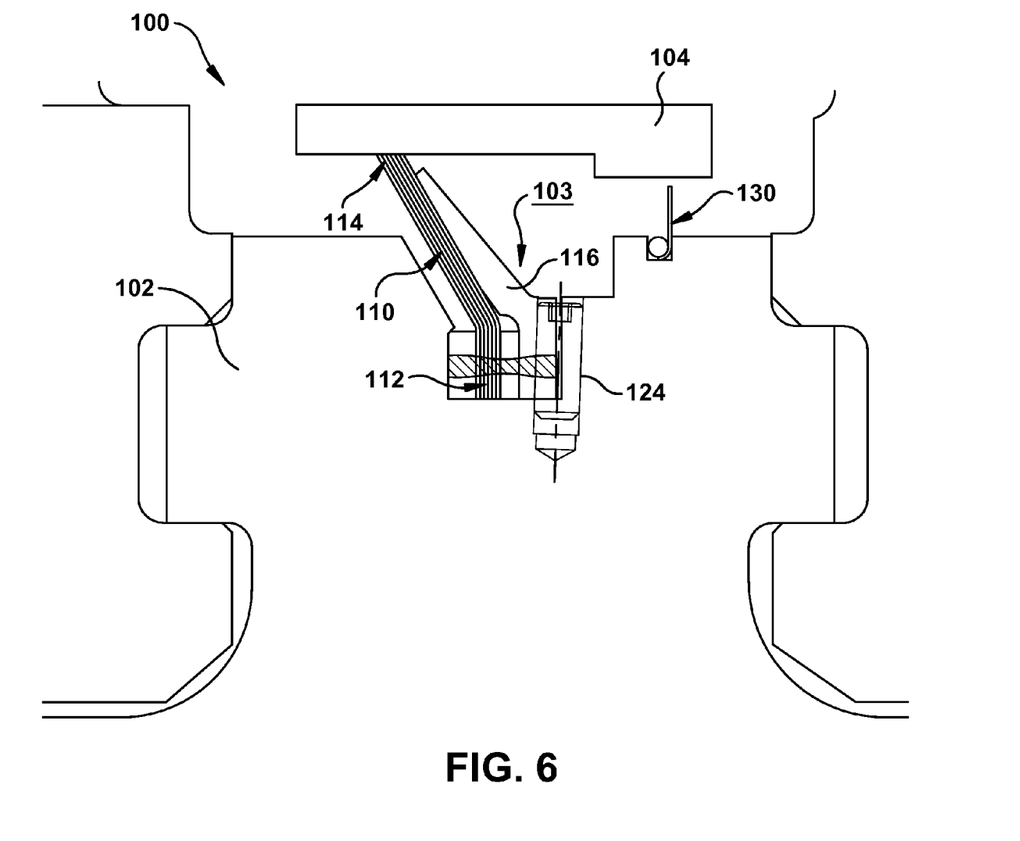

In a third example, shown in FIG. 6, the set of bristles 110 is bent as in FIG. 5, but in this example, a screw 124, e.g., a grub screw, is used to attach retaining plate 116 to rotating component 102. Screw 124 can be screwed through retaining plate 116 into rotating component 102, in addition to, or in place of, the caulk/friction combination that is used in FIGS. 4 and 5. It is also understood that other fasteners, other than a screw, can be used, for example, a bolt, a pin, etc.

Figure 7:
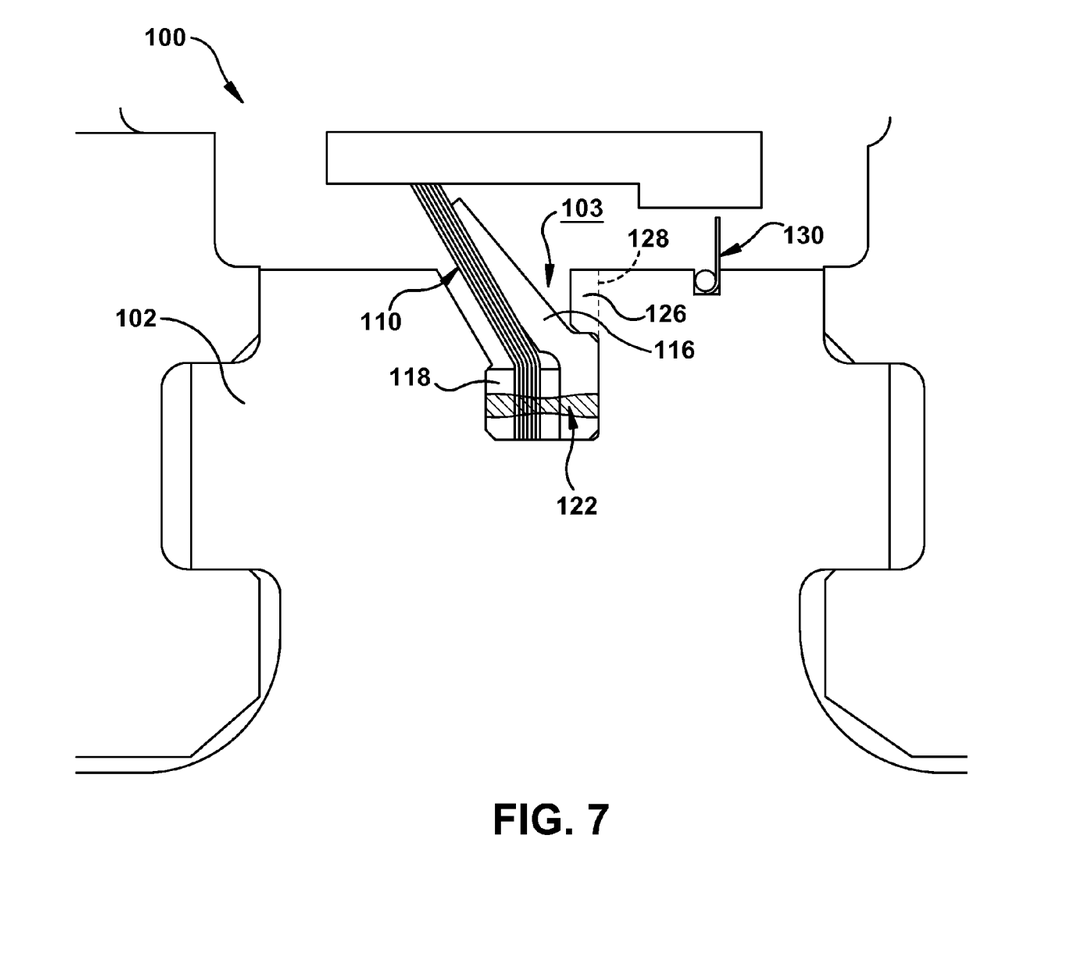

In a fourth example, shown in FIG. 7, a dovetail assembly can be used to attach retaining plate 116 and the set of bristles 110 to rotating component 102. In this example, groove 103 includes a retaining feature 126 which holds retaining plate 116 (which is attached to the set of bristles 110 through the use of a weld 122 and side plate 118 in this example) in place once the set of bristles 110 is slid circumferentially into groove 103. In order to facilitate sliding the set of bristles 110 into groove 103, an entry dovetail slot 128 can be used (illustrated by dotted line in FIG. 7).

Figure 8:
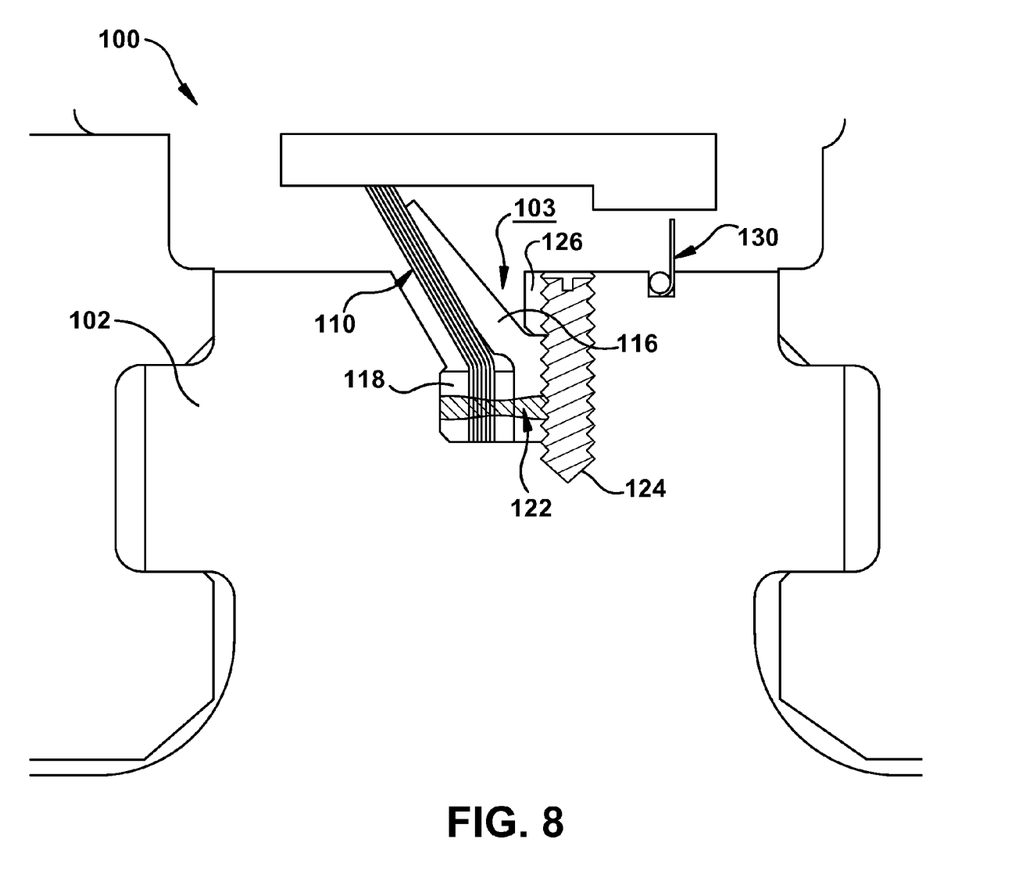

In another embodiment, shown in FIG. 8, a modification of the configurations shown in FIGS. 6 and 7 is shown. In this embodiment, shown in FIG. 8, a retaining feature 126 (similar to FIG. 7) can be used along with a pin or grub screw 124 (similar to FIG. 6), where one or more pins 124 can act as anti-rotation mechanisms for brush seal 100 elements. A variety of configurations for pins 124 are possible (and applicable to any embodiments shown herein including pins 124). For example, (1) one anti-rotation pin 124 per segment can be used, with pins 124 either at a middle section of a segment, or just inboard of the end of the segment to limit segment movement which could lead to imbalance, (2) one anti-rotation pin 124 can be used, positioned on each side of the entry slot 128 (FIG. 7), or (3) one anti-rotation pin 124 can be used, positioned between the two adjacent segment ends, and centered in the middle of entry slot 128 (FIG. 7).

Turning to FIGS. 13-15, additional configurations for attaching fixed end 112 of set of bristles 110 to rotating component 102 are shown. As in the examples shown in FIGS. 4-8, retaining plate 116 can be attached to second, back, side 103b through the use of a caulk 120 along faces of retaining plate 116 that contact a top area of back side 103b of groove 103 (FIG. 13) or a bottom of back side 103b of groove 103 (FIG. 14). In another example, shown in FIG. 15, a dovetail assembly 126 can be used to attach retaining plate 116 to rotating component 102 similar to the embodiment shown in FIG. 7. For example, groove 103 can include a retaining feature 126 which holds retaining plate 116 in place in groove 103. In order to facilitate sliding retaining plate 116 into groove 103, an entry dovetail slot 128 can be used (illustrated by dotted line in FIG. 15).

In contrast to the examples shown in FIGS. 4-8, where fixed end 112 is attached to rotating component 102 through the use of a side plate 118 that is welded to the set of bristles and attached to retaining plate 116, FIGS. 13-15 show various embodiments where mechanical clamping means, e.g., a core element 136 and a clamping element 138, are used to attach fixed end 112 to rotating component 102.

As shown in FIG. 13, in one embodiment, fixed end 112 of set of bristles 110 is wrapped, or wound, around core element 136. Core element 136 is shown as a spherical shaped element, but it is understood that other geometries can be used, for example, semi-spherical, oval, square, rectangular, etc. It is also understood that set of bristles 110 need not fully wrap around core element 136, but can be only partially wrapped. Clamping member 138 is then used to clamp fixed end 112 in place around core element 136. In the embodiment shown in FIG. 13, clamping member 138 has an annular shape with an opening for engaging core element 136. For example, clamping member 138 can have a cross-sectional C-shape.

Clamping member 138, once placed over bristles 110 wrapped around core element 136, can be clamped using any known means. For example, clamping element 138 could comprise a compliant metal that can be deformed using a tool to compress bristles 110 against core element 136. In another example, clamping element 138 could comprise a less compliant metal where the opening of clamping element 138 is pushed over core element 136, and because claiming element 138 is sized to just fit over core element 136, clamping element 138 holds bristles 110 against core element 136.

Clamping element 138 can be positioned proximate to front side 103a of groove 103, between front side 103a and retaining element 116, or proximate to back side 103b of groove 103, between back side 103b and retaining element 116. Clamping element 138 is sized to fit between retaining element 116 and front side 103a or back side 103b of groove 103, thus when inserted into groove 103, clamping element 138 (which is clamped onto bristles 110 and core element 136) is friction fitted within groove 103, between front side 103a (or back side 103b) and retaining element 116. Thus, rotating brush seal 100 is securely attached to rotating component 102. Using core element 136 and clamping element 138 to secure set of bristles 110 to rotating component 102 can eliminate the need for at least one welded joint that is needed in the embodiments shown in FIGS. 4-8, and therefore can reduce additional weld-related stress concerns.

As shown in FIG. 13, similar to the embodiment shown in FIG. 4, set of bristles 110 can be substantially planar, i.e., not bent, or, as shown in FIGS. 14 and 15, similar to the embodiments shown in FIGS. 5-8, the set of bristles 110 can be bent such that fixed end 112 is axially displaced with respect to free end 114. Therefore, conical retaining plate 116 is similarly bent, such that conical retaining plate 116 extends along at least a portion of the length of the set of bristles 110. The bristles used in such a case can be metal or a plastic material.

Figure 16:
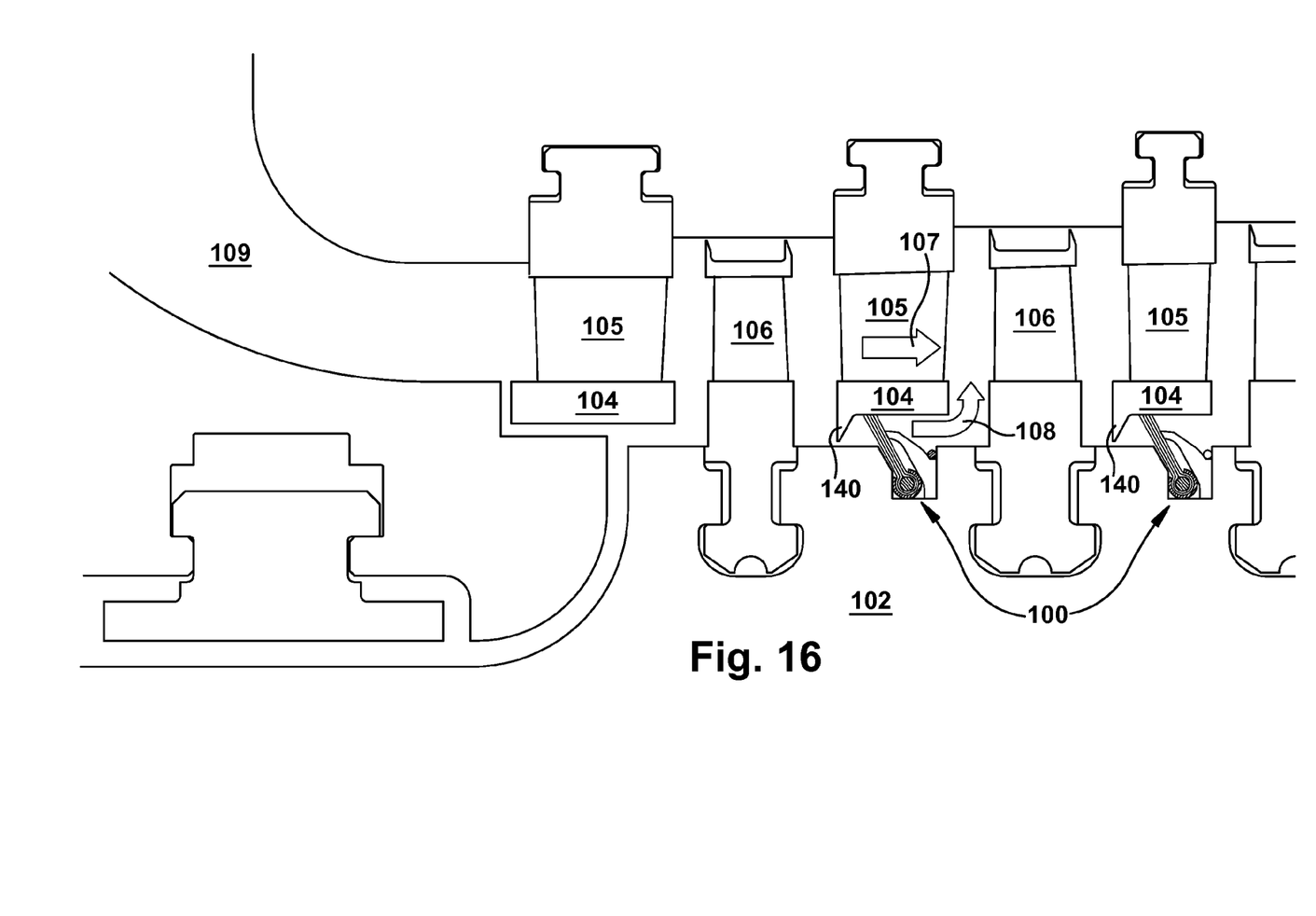
FIG. 16 shows a partial cross-sectional view of a turbomachine including a brush seal according to an embodiment of the invention.

Turning to FIG. 16, another embodiment utilizing brush seal 100 secured by mechanical means is shown. As shown in FIG. 16, the main flow through the turbomachine (shown with arrow 107) enters the turbine section through an inlet 109. The main flow 107 then expands through a series of alternating nozzles (or stators) 105 and buckets (or rotors) 106 to drive rotation of the rotating component 102. Nozzle 105 normally turns the flow 107 tangentially and the bucket reverses the flow into mainly axially, thus retracting mechanical energy from the flow 107. However, when leakage flow (illustrated by arrow 108) passes rotating brush seal 100, the leakage flow gains a tangential (circumferential) velocity component of about the same value of the local rotating speed. The tangential velocity component is usually defined as the swirl ratio, which is the ratio of tangential velocity to the rotational speed. The leakage 108 may mix with main flow 107 with a swirl ratio of approximately 1.0, and then enter the next bucket 106 at an incident angle that is close to design value. In this way, the flow mixing loss and secondary flow loss in bucket flowpath are significantly reduced. In conventional systems as shown in FIG. 1, the leakage through static brush seal 15 or other static components is mainly axial. Large mixing loss and secondary flow loss can result from a mismatch of circumferential velocity between leakage flow and main flow.

Therefore, the rotating bristles of brush seal 100 induce swirls that align leakage flow 108 to a similar tangential angle to the main flow 107 in the flowpath of the turbomachine. In other words, in one embodiment, where the stationary component comprises a nozzle, the main flow through the turbomachine is directed into a rotational direction of the turbomachine, and the leakage flow through the turbomachine is directed into the same rotational direction. Therefore, the swirl ratio of the main flow at an exit nozzle and the swirl ratio of the leakage flow downstream from the brush seal is approximately 1.0.

Using mechanical means, such as core element 136 and clamping element 138, rather than the welded means of securing the bristles means that the bristles are not subject to thermal fusion that would occur during the welding process. Therefore, the brush seal according to this embodiment can better handle stress in high-speed and high-temperature applications when compared to conventional welded assemblies.

In any of the embodiments discussed herein, retaining plate 116 can be integrally machined into rotating component 102 or can comprise a separate element that is welded or otherwise attached to rotating component 102. If retaining plate 116 is integral to rotating component 102, as discussed herein, an entry groove/slot (similar to slot 128 shown in FIGS. 7 and 15) can be used to insert the set of bristles 110 into rotating component 102. In these embodiments, a relatively small entry slot 128 can be used, and this embodiment could result in a relatively more compliant brush seal 100 because the set of bristles 110 could be bent as it is fed into the groove/slot. Bending the set of bristles 110 in this way could result in less gap leakages between the segments of brush seal 100, as well as minimize the issues of holding the set of bristles 110 in the area of the entry slot. These embodiments would further reduce the total rotating mass of brush seal 100 as an additional back plate would not be necessary.

Regardless of how brush seal 100 is mounted to rotating component 102, the axial angle of the set of bristles 110 of brush seal 100 assists in allowing brush seal 100 to seal effectively. Since brush seal 100 rotates with rotating component 102, if the set of bristles 110 were angled substantially circumferentially, the centrifugal loading would tend to straighten the bristles out and cause bending stress at the root of the bristles. In addition, if the set of bristles 110 are allowed to straighten out, the bristles will not move inward easily, and can buckle or be damaged when brush seal 100 moves toward stationary component 104 during rotor excursion or vibration. Therefore, a large cant angle or lay angle is not desirable for rotating brush seal 100 according to embodiments of this invention.

Figures 9, 10, 11, 12:
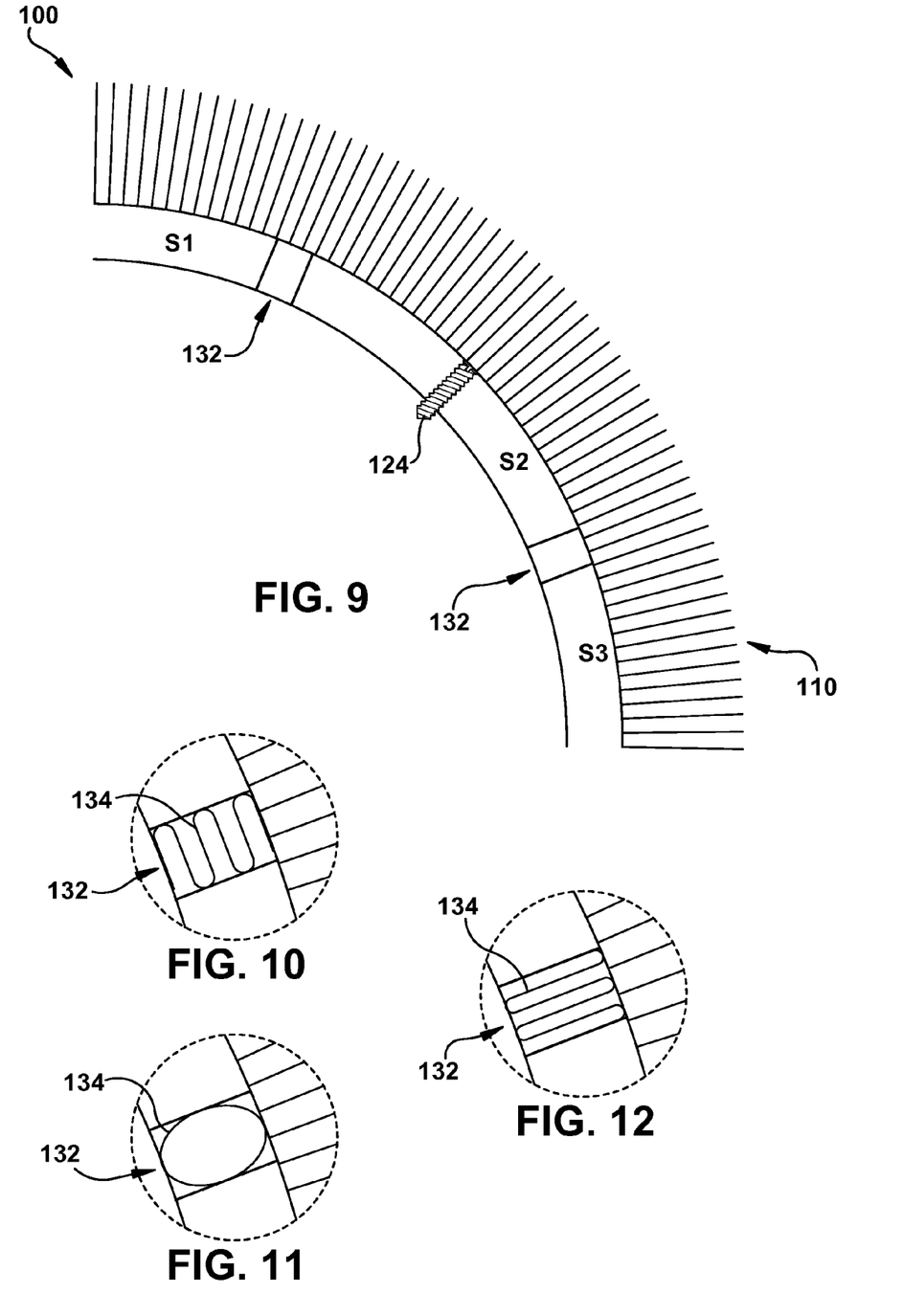
FIG. 9 shows an axial cross-sectional view of a portion of a brush seal according to embodiments of this invention.
FIGS. 10-12 show exploded views of gaps between arcuate segments of a brush seal according to embodiments of this invention.

Therefore, as discussed herein, the set of bristles 110 is not angled substantially circumferentially as in prior art brush seals, but rather is mainly angled axially, and is supported by conical retaining plate 116. This is further illustrated in FIG. 9, showing a partial axial cross-sectional view of brush seal 100, showing the set of bristles 110 are not substantially circumferentially angled. When the turbomachine is in an operative state, the set of bristles 110 is pressed against retaining plate 116 by centrifugal force. Angling the set of bristles 110 axially, in accordance with embodiments of this invention, will cause the bristles to bend forward and away from conical retaining plate 116 if seal 100 is pushed by stationary component 104.

As also shown in FIG. 9, brush seal 100 can comprise a series of arcuate segments (three segments S1, S2, S3 are partially shown in FIG. 9, but it is understood that in practice, brush seal 100 can comprise a plurality of arcuate segments that will form a complete ring.) As shown in FIG. 9, gaps 132 are typically included between segments, referred to as butt gaps 132. As shown in FIG. 9, a spring 134 can be inserted in one or more butt gaps 132. Springs 134 can act to allow for thermal expansion due to brush seal 100 heating faster than rotating component 102 on startup as well as to account for different coefficients of thermal expansion between rotating component 102 and brush seal 100. Springs 134 also act to keep pressure on the segments to damp aeromechanical vibration. Springs 134 can comprise thin and stiff springs, such as wave springs, of any shape desired. Three examples of different shapes and configurations of springs 134 are shown in the exploded views of gaps 132 in FIGS. 10-12. FIG. 9 further shows an anti-rotation grub screw 124 (as discussed in connection with FIG. 8), with grub screw 124 position in the middle of segment S2.

In one embodiment of the invention, the pressure loading is from left to right referring to FIGS. 4-8 and 13-15, with the set of bristles 110 facing a higher pressure side of the brush seal, while retaining plate 116 is exposed to a downstream side of the brush seal with lower pressure. In such an arrangement, both the pressure force and centrifugal force act to press the set of bristles 110 against retaining plate 116 and balance the pressure loading. In another embodiment of the invention, the pressure loading can be from right to left (or vice versa, depending on the orientation of the turbomachine), where the retaining plate 116 is exposed to the higher pressure side, and the set of bristles 110 faces the lower pressure side.

The axial angle, β, of the set of bristles 110 can be set to achieve desired flexibility without requiring excessive axial space. In one embodiment, the set of bristles 110 can be angled in an axial direction with respect to rotating component 102 at an axial angle of approximately 15 degrees to approximately 75 degrees, for example, at approximately 45 to 60 degrees.

As discussed herein, a circumferential angle of the set of bristles 110 is not necessary to make brush seal 100 flexible. However, a small circumferential angle, substantially less than the axial angle, may be beneficial for seal 100, not for flexibility reasons, but for operability, for example, in the range of approximately 0 to 15 degrees. Therefore, a small cant angle in a circumferential direction can be used, where the set of bristles 110 will contract owing to the cant angle, opening up clearance between seal 100 and stationary component 104 at no or low speed to avoid rub during transient. As speed goes up to operating condition, the set of bristles 110 will stretch out, reducing the cant angle, thus closing up the gap between the tips of the set of bristles 110 and stationary component 104.

An additional benefit of brush seal 100 according to embodiments of this invention is that the heat generated by brush seal 100 will not cause rotor bowing like conventional brush seals because the bristle tips slide on stationary component 104. The heat generated by the rubbing of the tips of the set of bristles 110 on stationary component 104 will partly go into stationary component 104 and partly be taken away by leakage through the set of bristles 110. Therefore, there is little to no heat going into rotating component 102. In contrast, in conventional brush seals, the bristle tips rub the surface of the rotating component, which heats up the rotating component directly. This heating of the rotating component can cause the rotating component to bow and further increase undesirable non-uniform heating.

Regardless of how brush seal 100 is mounted to rotating component 102, it is understood that additional seals can be used in conjunction with brush seal 100. For example, as shown in FIGS. 4-8, one or more tooth seals, such as J-strip seals 130, can be used. J-strip seals 130 can have a fixed end attached to rotating component 102 and a free end extending radially outward from rotating component 102 toward stationary component 104. J-strip seals 130 can be positioned axially upstream and/or downstream of brush seal 100. In another embodiment, in addition to J-strip seals 130 or as an alternative to J-strip seals 103, inward teeth 140 can be used. Inward teeth 140 can extend from stationary component 104 towards rotating component 102, as shown in FIG. 16.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A brush seal for use between a rotating component and a stationary component in a turbomachine, the brush seal comprising:
    a set of flexible bristles having a fixed end and a free end;
    a circumferential groove in the rotating component, the circumferential groove having a downstream side and an upstream side;
    a conical retaining plate, wherein the conical retaining plate is attached to the downstream side of the circumferential groove;
    wherein the fixed end is attached to the rotating component with a mechanical clamping element, the mechanical clamping element partially surrounds the core element and the fixed end of the set of flexible bristles, and the mechanical clamping element is friction fitted between and contacts both an inner surface of the conical retaining plate and the upstream side of the circumferential groove to secure the fixed end of the set of flexible bristles within the circumferential groove in the rotating component;
    wherein the conical retaining plate extends at least partially along a length of the set of flexible bristles, such that the conical retaining plate is configured to at least partially support the set of flexible bristles on the inner surface of the conical retaining plate from centrifugal loading in an operative state of the turbomachine; and
    wherein the set of flexible bristles are angled axially at an axial angle with respect to the rotating component.

2. The brush seal of claim 1, wherein the set of flexible bristles is bent such that the fixed end of the set of flexible bristles is axially displaced with respect to the free end of the set of flexible bristles.

3. The brush seal of claim 1, wherein the set of flexible bristles comprise either metal or plastic wires.

4. The brush seal of claim 1, wherein the brush seal comprises a series of arcuate segments forming a ring when assembled into the rotating component.

5. The brush seal of claim 1, wherein the axial angle is approximately 15 degrees to approximately 75 degrees.

6. The brush seal of claim 1, wherein the axial angle is approximately 45 degrees to approximately 60 degrees.

7. the brush seal of claim 1, wherein the set of flexible bristles are angled circumferentially at an angle substantially less than the axial angle.

8. A turbomachine comprising:
    a rotating component having a circumferential groove therein, the circumferential groove having an upstream side and a downstream side;
    a stationary component; and
    a brush seal for use between the rotating component and the stationary component, the brush seal comprising:
        a set of flexible bristles having a fixed end and a free end;
        a conical retaining plate extending at least partially along a length of the set of flexible bristles, such that the conical retaining plate is configured to at least partially support the set of flexible bristles on an inner surface of the conical retaining plate from centrifugal loading in an operative state of the turbomachine, wherein the conical retaining plate is attached to the downstream side of the circumferential groove;

wherein the fixed end is wrapped at least partially around a core element and the free end extends towards the stationary component, and wherein the set of flexible bristles are angled axially at an axial angle with respect to the rotating component; and a clamping element partially surrounding the core element and the fixed end of the set of flexible bristles, wherein the clamping element is friction fitted between and contacts both the inner surface of the conical retaining plate and the upstream side of the circumferential groove to secure the fixed end of the set of flexible bristles within the circumferential groove in the rotating component.

9. The brush seal of claim 8, wherein the axial angle is approximately 15 degrees to approximately 75 degrees.

10. The turbomachine of claim 8, wherein the set of flexible bristles are angled circumferentially at an angle substantially less than the axial angle.

11. The turbomachine of claim 8, wherein the set of flexible bristles is bent such that the fixed end of the set of flexible bristles is axially displaced with respect to the free end of the set of flexible bristles.

12. The turbomachine of claim 8, wherein the rotating component includes at least one seal tooth extending radially outward from the rotating component toward the stationary component.

13. The turbomachine of claim 8, wherein the stationary component includes at least one seal tooth extending radially inward from the stationary component toward the rotating component.

14. The turbomachine of claim 8, wherein the stationary component comprises a nozzle which directs a main flow through the turbomachine into a rotational direction of the turbomachine; and wherein the brush seal directs a leakage flow through the turbomachine into the rotational direction.

15. The turbomachine of claim 14, wherein a swirl ratio of the main flow at an exit nozzle and a swirl ratio of the leakage flow downstream from the brush seal is approximately 1.0.

* * * * *